(12) United States Patent
Yu et al.

(10) Patent No.: US 9,571,179 B2
(45) Date of Patent: *Feb. 14, 2017

(54) SYSTEM AND METHOD FOR MULTI-USER MULTIPLEXING

(71) Applicant: BlackBerry Limited, Waterloo (CA)

(72) Inventors: Yi Yu, Reston, VA (US); James Earl Womack, Bedford, TX (US); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 76 days.

This patent is subject to a terminal disclaimer.

(21) Appl. No.: 14/298,629

(22) Filed: Jun. 6, 2014

(65) Prior Publication Data

US 2014/0286234 A1    Sep. 25, 2014

Related U.S. Application Data

(63) Continuation of application No. 13/548,817, filed on Jul. 13, 2012, now Pat. No. 8,837,303, which is a continuation of application No. 12/337,207, filed on Dec. 17, 2008, now Pat. No. 8,311,061.

(51) Int. Cl.
  *H04W 74/00* (2009.01)
  *H04B 7/155* (2006.01)
  *H04W 28/06* (2009.01)

(52) U.S. Cl.
  CPC ......... *H04B 7/15528* (2013.01); *H04W 28/06* (2013.01); *H04W 74/004* (2013.01)

(58) Field of Classification Search
  CPC .. H04B 7/15528; H04W 28/06; H04W 74/004
  See application file for complete search history.

(56) References Cited

U.S. PATENT DOCUMENTS

| | | | |
|---|---|---|---|
| 6,014,375 A | 1/2000 | Janky | |
| 6,512,745 B1 | 1/2003 | Abe et al. | |
| 6,690,657 B1 | 2/2004 | Lau et al. | |
| 6,785,510 B2 | 8/2004 | Larsen | |
| 7,054,633 B2 | 5/2006 | Seo et al. | |

(Continued)

FOREIGN PATENT DOCUMENTS

| | | | |
|---|---|---|---|
| CN | 1941666 A | 4/2007 | |
| CN | 1960352 A | 5/2007 | |

(Continued)

OTHER PUBLICATIONS

Japanese Office Action; Application No. 2011-542162; Oct. 17, 2012; 10 pages.

(Continued)

*Primary Examiner* — David Oveissi
(74) *Attorney, Agent, or Firm* — Conley Rose, P.C.; J. Robert Brown, Jr.; Albert A. Abbou

(57) ABSTRACT

A relay node is described herein, the relay node comprising a network connectivity device configured to receive a plurality of medium access control layer (MAC) packet data units (PDUs) from a plurality of user agents; a processor configured to multiplex the plurality of MAC PDUs to form a Super-MAC PDU; and wherein the network connectivity device is further configured to transmit the Super-MAC PDU to an access node.

29 Claims, 6 Drawing Sheets

(56) References Cited

U.S. PATENT DOCUMENTS

| | | | |
|---|---|---|---|
| 7,061,879 B2 | 6/2006 | Oprescu-Surcobe et al. |
| 7,130,614 B2 | 10/2006 | Sreemanthula et al. |
| 7,227,851 B1 | 6/2007 | Gopalakrishnan et al. |
| 7,349,665 B1 | 3/2008 | Zhu et al. |
| 7,386,036 B2 | 6/2008 | Pasanen et al. |
| 7,564,827 B2 | 7/2009 | Das et al. |
| 7,577,124 B2 | 8/2009 | Yomo et al. |
| 7,602,843 B2 | 10/2009 | Cho et al. |
| 7,673,211 B2 | 3/2010 | Meyer et al. |
| 7,706,408 B2 | 4/2010 | Takagi et al. |
| 7,724,767 B2 | 5/2010 | Oksman |
| 7,742,448 B2 | 6/2010 | Ramachandran et al. |
| 7,830,837 B2 | 11/2010 | Park et al. |
| 7,873,002 B2 | 1/2011 | Cai |
| 7,898,948 B2 | 3/2011 | DiGirolamo et al. |
| 8,072,918 B2 | 12/2011 | Muharemovic et al. |
| 8,121,552 B2 | 2/2012 | Agami et al. |
| 8,175,014 B2 | 5/2012 | Terry et al. |
| 8,228,851 B2 | 7/2012 | Wu |
| 8,234,534 B2 | 7/2012 | Park et al. |
| 8,265,016 B2 | 9/2012 | Xu |
| 8,281,211 B2 | 10/2012 | Wang et al. |
| 8,391,202 B2 | 3/2013 | Courseille |
| 8,428,016 B2 | 4/2013 | Bhattad et al. |
| 8,576,882 B2* | 11/2013 | Zhang ................ H04L 12/4633 370/279 |
| 8,605,674 B2 | 12/2013 | Park et al. |
| 2002/0032032 A1 | 3/2002 | Haumont et al. |
| 2002/0155839 A1 | 10/2002 | Nisbet |
| 2002/0187746 A1 | 12/2002 | Cheng et al. |
| 2003/0096631 A1 | 5/2003 | Kayama et al. |
| 2003/0101274 A1* | 5/2003 | Yi ............................ H04L 47/10 709/232 |
| 2003/0103480 A1 | 6/2003 | You et al. |
| 2004/0042492 A1 | 3/2004 | Suzuki et al. |
| 2004/0063451 A1 | 4/2004 | Bonta et al. |
| 2004/0266339 A1 | 12/2004 | Larsson |
| 2005/0014464 A1 | 1/2005 | Larsson |
| 2005/0037798 A1 | 2/2005 | Yamashita et al. |
| 2005/0042987 A1 | 2/2005 | Lee et al. |
| 2005/0148311 A1 | 7/2005 | Anderson |
| 2005/0232212 A1 | 10/2005 | Kang et al. |
| 2006/0183421 A1 | 8/2006 | Proctor, Jr. et al. |
| 2006/0239455 A1 | 10/2006 | Kato |
| 2007/0002766 A1 | 1/2007 | Park et al. |
| 2007/0058661 A1 | 3/2007 | Chow |
| 2007/0070953 A1 | 3/2007 | Yoon et al. |
| 2007/0081483 A1 | 4/2007 | Jang et al. |
| 2007/0082621 A1 | 4/2007 | Lee et al. |
| 2007/0097945 A1 | 5/2007 | Wang et al. |
| 2007/0104148 A1 | 5/2007 | Kang et al. |
| 2007/0153734 A1 | 7/2007 | Lee et al. |
| 2007/0155315 A1 | 7/2007 | Lee et al. |
| 2007/0171925 A1 | 7/2007 | Tanimoto |
| 2007/0206531 A1 | 9/2007 | Pajukoski et al. |
| 2007/0230605 A1 | 10/2007 | Osseiran et al. |
| 2007/0253421 A1 | 11/2007 | Cai |
| 2007/0274250 A1 | 11/2007 | Chen et al. |
| 2007/0287476 A1 | 12/2007 | Jeong et al. |
| 2007/0291696 A1 | 12/2007 | Zhang et al. |
| 2008/0002610 A1 | 1/2008 | Zheng et al. |
| 2008/0025248 A1 | 1/2008 | Naden |
| 2008/0025323 A1 | 1/2008 | Khan |
| 2008/0043671 A1 | 2/2008 | Moon et al. |
| 2008/0043710 A1 | 2/2008 | Zhou et al. |
| 2008/0056173 A1 | 3/2008 | Watanbe |
| 2008/0081628 A1 | 4/2008 | Ye et al. |
| 2008/0089282 A1 | 4/2008 | Malladi et al. |
| 2008/0101306 A1 | 5/2008 | Bertrand et al. |
| 2008/0101498 A1 | 5/2008 | Han et al. |
| 2008/0102794 A1 | 5/2008 | Keevill et al. |
| 2008/0107072 A1 | 5/2008 | Viorel et al. |
| 2008/0107076 A1 | 5/2008 | Ramachandran et al. |
| 2008/0107078 A1 | 5/2008 | Viorel et al. |
| 2008/0108303 A1 | 5/2008 | Okuda |
| 2008/0108304 A1 | 5/2008 | Suga |
| 2008/0159337 A1 | 7/2008 | Lee |
| 2008/0165776 A1 | 7/2008 | Tao et al. |
| 2008/0174470 A1 | 7/2008 | Lum et al. |
| 2008/0212513 A1 | 9/2008 | Tao et al. |
| 2008/0225765 A1 | 9/2008 | Marinier et al. |
| 2008/0225772 A1 | 9/2008 | Xu |
| 2008/0227449 A1 | 9/2008 | Gholmieh et al. |
| 2008/0227461 A1 | 9/2008 | Dayal et al. |
| 2008/0232284 A1 | 9/2008 | Dalsgaard et al. |
| 2008/0232493 A1 | 9/2008 | Zhang et al. |
| 2008/0247375 A1 | 10/2008 | Muharemovic et al. |
| 2008/0285500 A1 | 11/2008 | Zhang et al. |
| 2008/0285501 A1 | 11/2008 | Zhang et al. |
| 2008/0293358 A1 | 11/2008 | Andersson et al. |
| 2008/0310389 A1 | 12/2008 | Suzuki et al. |
| 2008/0311904 A1 | 12/2008 | Courseille |
| 2009/0010199 A1 | 1/2009 | Adachi et al. |
| 2009/0046641 A1 | 2/2009 | Wang et al. |
| 2009/0061892 A1 | 3/2009 | Lee et al. |
| 2009/0061920 A1 | 3/2009 | Horiuchi et al. |
| 2009/0111476 A1 | 4/2009 | Hamalainen et al. |
| 2009/0116423 A1 | 5/2009 | Ni et al. |
| 2009/0154533 A1 | 6/2009 | Khayrallah et al. |
| 2009/0190522 A1 | 7/2009 | Horn et al. |
| 2009/0191882 A1 | 7/2009 | Kovacs et al. |
| 2009/0196177 A1* | 8/2009 | Teyeb .................. H04B 7/2606 370/231 |
| 2009/0196332 A1 | 8/2009 | Miyatani |
| 2009/0239568 A1 | 9/2009 | Bertrand et al. |
| 2009/0252079 A1 | 10/2009 | Zhang et al. |
| 2009/0252088 A1 | 10/2009 | Rao et al. |
| 2009/0264077 A1 | 10/2009 | Damnjanovic |
| 2009/0276672 A1 | 11/2009 | Lee et al. |
| 2009/0291679 A1 | 11/2009 | Wu |
| 2009/0303918 A1 | 12/2009 | Ma et al. |
| 2009/0313518 A1 | 12/2009 | Shen et al. |
| 2009/0325480 A1 | 12/2009 | Ji et al. |
| 2009/0325618 A1 | 12/2009 | Aiba et al. |
| 2010/0003977 A1 | 1/2010 | Pinheiro et al. |
| 2010/0005351 A1 | 1/2010 | Ahn et al. |
| 2010/0027457 A1 | 2/2010 | Okuda |
| 2010/0027458 A1 | 2/2010 | Wu et al. |
| 2010/0039947 A1 | 2/2010 | Li et al. |
| 2010/0046413 A1 | 2/2010 | Jin et al. |
| 2010/0046418 A1 | 2/2010 | Horn et al. |
| 2010/0056197 A1 | 3/2010 | Attar et al. |
| 2010/0061361 A1 | 3/2010 | Wu |
| 2010/0074209 A1 | 3/2010 | Montojo et al. |
| 2010/0080166 A1 | 4/2010 | Palanki et al. |
| 2010/0091759 A1 | 4/2010 | Stahl et al. |
| 2010/0098045 A1 | 4/2010 | Miyazaki |
| 2010/0103845 A1 | 4/2010 | Ulupinar et al. |
| 2010/0110967 A1 | 5/2010 | Sartori et al. |
| 2010/0120442 A1 | 5/2010 | Zhuang et al. |
| 2010/0131814 A1 | 5/2010 | Chiu |
| 2010/0135231 A1 | 6/2010 | Harada et al. |
| 2010/0135251 A1 | 6/2010 | Sambhwani et al. |
| 2010/0142433 A1 | 6/2010 | Womack et al. |
| 2010/0182992 A1 | 7/2010 | Chun et al. |
| 2010/0184434 A1 | 7/2010 | Jeong et al. |
| 2010/0202307 A1 | 8/2010 | Lee et al. |
| 2010/0271999 A1 | 10/2010 | Yu et al. |
| 2010/0296431 A1 | 11/2010 | Terry et al. |
| 2010/0297993 A1 | 11/2010 | Heo et al. |
| 2010/0302998 A1 | 12/2010 | Bao et al. |
| 2010/0322145 A1 | 12/2010 | Yu et al. |
| 2010/0322194 A1 | 12/2010 | Hu et al. |
| 2010/0323612 A1 | 12/2010 | Xu et al. |
| 2010/0323614 A1 | 12/2010 | Yu et al. |
| 2010/0323684 A1 | 12/2010 | Cai et al. |
| 2010/0325506 A1 | 12/2010 | Cai et al. |
| 2011/0026409 A1 | 2/2011 | Hu et al. |
| 2011/0041027 A1 | 2/2011 | Fong et al. |
| 2011/0092212 A1 | 4/2011 | Kubota |
| 2011/0110258 A1 | 5/2011 | Ishii et al. |
| 2011/0261763 A1 | 10/2011 | Chun et al. |
| 2011/0317648 A1 | 12/2011 | Lee et al. |

(56) References Cited

U.S. PATENT DOCUMENTS

| | | |
|---|---|---|
| 2012/0057560 A1 | 3/2012 | Park et al. |
| 2013/0094431 A1 | 4/2013 | Terry et al. |
| 2015/0163821 A1 | 6/2015 | Wu |

FOREIGN PATENT DOCUMENTS

| | | |
|---|---|---|
| CN | 101047431 A | 10/2007 |
| CN | 101141171 A | 3/2008 |
| CN | 101217337 A | 7/2008 |
| CN | 101222299 A | 7/2008 |
| CN | 101257492 A | 9/2008 |
| CN | 101296060 A | 10/2008 |
| EP | 1534035 A1 | 5/2005 |
| EP | 1773091 A2 | 4/2007 |
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1924009 A1 | 5/2008 |
| EP | 1940185 A1 | 7/2008 |
| EP | 1959708 A1 | 8/2008 |
| EP | 1995921 A2 | 11/2008 |
| EP | 2242306 A1 | 10/2010 |
| JP | 2004328665 A | 11/2004 |
| JP | 2006311253 A | 11/2006 |
| JP | 2007312244 A | 11/2007 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118651 A | 5/2008 |
| JP | 2008118652 A | 5/2008 |
| JP | 2008131649 A | 6/2008 |
| JP | 2008167141 A | 7/2008 |
| JP | 2008172754 A | 7/2008 |
| JP | 2008172759 A | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009188926 A | 8/2009 |
| JP | 2009531898 A | 9/2009 |
| JP | 2009539299 A | 11/2009 |
| JP | 2010504665 A | 2/2010 |
| JP | 2010506447 A | 2/2010 |
| JP | 2010103638 A | 5/2010 |
| JP | 2010136337 A | 6/2010 |
| WO | 0137590 A1 | 5/2001 |
| WO | 2005064872 A1 | 7/2005 |
| WO | 2006024231 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008034335 A1 | 3/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Japanese Office Action as Received in Co-pending Application No. 2013-066527 on Jan. 23, 2014; 2 pages. (No English translation available).
PCT International Search Report; PCT Application No. PCT/US2009/062560; Mar. 1, 2010; 4 pages.
PCT Written Opinion of the International Searching Authority; PCT Application No. PCT/US2009/062560; Mar. 1, 2010; 7 pages.
Canadian Office Action; Application No. 2,747,343; May 24, 2013; 3 pages.
Chinese Office Action; Application No. 200980156891.7; Jul. 19, 2013; 34 pages.
Japanese Office Action; Application No. 2011-542163; Dec. 18, 2012; 7 pages.
Japanese Office Action; Application No. 2011-542163; Jul. 18, 2013; 10 pages.
PCT International Search Report; PCT Application No. PCT/US2009/062570; Feb. 22, 2010; 4 pages.
PCT Written Opinion of the International Searching Authority; PCT Application No. PCT/US2009/062570; Feb. 22, 2010; 8 pages.
Canadian Office Action; Application No. 2,750,828; Apr. 4, 2013; 4 pages.
Chinese Office Action; Application No. 200980156931.8; Jul. 3, 2013; 28 pages.
European Examination Report; Application No. 09756080.9; Jun. 15, 2012; 5 pages.
Japanese Office Action; Application No. 2011-542164; Oct. 26, 2012; 7 pages.
PCT International Search Report; PCT Application No. PCT/US2009/062571; Apr. 19, 2010; 6 pages.
PCT Written Opinion of the International Searching Authority; PCT Application No. PCT/US2009/062571; Apr. 19, 2010; 6 pages.
PCT International Preliminary Report on Patentability; PCT Application No. PCT/US2009/062571; Mar. 10, 2011; 8 pages.
Canadian Office Action; Application No. 2,747,349; Jul. 12, 2013; 3 pages.
Chinese Office Action; Application No. 200980156892.1; Jul. 23, 2013; 16 pages.
Chinese Office Action; Application No. 200980156892.1; Dec. 31, 2013; 16 pages.
Chinese Office Action; Application No. 200980156892.1; Apr. 2, 2014; 20 pages.
Japanese Office Action; Application No. 2011-542165; Oct. 26, 2012; 7 pages.
Japanese Office Action; Application No. 2011-542165; Jun. 20, 2013; 7 pages.
Japanese Office Action; Application No. 2011-542165; Nov. 6, 2013; 5 pages.
Korean Office Action; Application No. 10-2011-7016425; Oct. 30, 2012; 9 pages.
PCT International Search Report; PCT Application No. PCT/US2009/062574; Jul. 19, 2010; 6 pages.
PCT Written Opinion of the International Searching Authority; PCT Application No. PCT/US2009/062574; Jul. 19, 2010; 9 pages.
PCT International Search Report; PCT Application No. PCT/US2009/064398; Mar. 18, 2010; 5 pages.
PCT Written Opinion of the International Searching Authority; PCT Application No. PCT/US2009/064398; Mar. 18, 2010; 9 pages.
Canadian Office Action; Application No. 2,747,377; Aug. 19, 2013; 3 pages.
Chinese Office Action; Application No. 200980156928.6; Sep. 23, 2013; 15 pages.
Japanese Office Action; Application No. 2011-542177; Oct. 26, 2012; 10 pages.

(56) References Cited

OTHER PUBLICATIONS

Japanese Office Action; Application No. 2011-542177; Apr. 26, 2013; 12 pages.
Final Office Action dated Mar. 23, 2015; U.S. Appl. No. 13/865,810, filed Apr. 18, 2013; 43 pages.
Advisory Action dated Jun. 12, 2015; U.S. Appl. No. 13/865,810, filed Apr. 18, 2013; 3 pages.
Canadian Office Action; Application No. 2,747,593; Mar. 26, 2015; 3 pages.
3GPP TS 36.300 V8.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2008; 137 pages.
Canadian Office Action; Application No. 2,746,635; Jan. 22, 2015; 4 pages.
Chinese Office Action; Application No. 200980149651.4; Nov. 24, 2014; 12 pages.
Office Action dated Aug. 19, 2011; U.S. Appl. No. 12/331,992, filed Dec. 10, 2008; 52 pages.
Final Office Action dated Dec. 9, 2011; U.S. Appl. No. 12/331,992, filed Dec. 10, 2008; 24 pages.
Office Action dated Feb. 14, 2014; U.S. Appl. No. 12/331,992, filed Dec. 10, 2008; 81 pages.
Office Action dated Jul. 21, 2011; U.S. Appl. No. 12/340,418, filed Dec. 19, 2008; 34 pages.
Final Office Action dated Jan. 5, 2012; U.S. Appl. No. 12/340,418, filed Dec. 19, 2008; 22 pages.
Final Office Action dated Oct. 2, 2012; U.S. Appl. No. 12/340,418, filed Dec. 19, 2008; 29 pages.
Notice of Allowance dated Jan. 17, 2013; U.S. Appl. No. 12/340,418, filed Dec. 19, 2008; 25 pages.
Office Action dated Mar. 21, 2012; U.S. Appl. No. 12/337,229, filed Dec. 17, 2008; 49 pages.
Notice of Allowance dated Aug. 28, 2012; U.S. Appl. No. 12/337,229, filed Dec. 17, 2008; 6 pages.
Office Action dated Jun. 16, 2011; U.S. Appl. No. 12/340,412, filed Dec. 19, 2008; 33 pages.
Final Office Action dated Nov. 8, 2011; U.S. Appl. No. 12/340,412, filed Dec. 19, 2008; 19 pages.
Office Action dated Feb. 17, 2012; U.S. Appl. No. 12/340,412, filed Dec. 19, 2008; 19 pages.
Notice of Allowance dated Aug. 10, 2012; U.S. Appl. No. 12/340,412, filed Dec. 19, 2008; 17 pages.
Office Action dated Jul. 12, 2010, 40 pages, U.S. Appl. No. 12/337,207, filed Dec. 17, 2008.
Office Action dated Jan. 25, 2011, 39 pages, U.S. Appl. No. 12/337,207, filed Dec. 17, 2008.
Office Action dated Jul. 13, 2011; U.S. Appl. No. 12/337,207, filed Dec. 17, 2008; 34 pages.
Final Office Action dated Dec. 16, 2011; U.S. Appl. No. 12/337,207, filed Dec. 17, 2008; 37 pages.
Advisory Action dated Mar. 2, 2012; U.S. Appl. No. 12/337,207, filed Dec. 17, 2008; 3 pages.
Notice of Allowance dated Jun. 12, 2012; U.S. Appl. No. 12/337,207, filed Dec. 17, 2008; 20 pages.
Office Action dated Oct. 12, 2012; U.S. Appl. No. 13/548,817, filed Jul. 13, 2012; 53 pages.
Final Office Action dated Jan. 24, 2013; U.S. Appl. No. 13/548,817, filed Jul. 13, 2012; 33 pages.
Advisory Action dated Apr. 12, 2013; U.S. Appl. No. 13/548,817, filed Jul. 13, 2012; 8 pages.
Office Action dated Sep. 13, 2013; U.S. Appl. No. 13/548,817, filed Jul. 13, 2012; 37 pages.
Notice of Allowance dated Mar. 17, 2014; U.S. Appl. No. 13/548,817, filed Jul. 13, 2012; 33 pages.
Office Action dated Jul. 22, 2011; U.S. Appl. No. 12/337,235, filed Dec. 17, 2008; 36 pages.
Final Office Action dated Jan. 9, 2012; U.S. Appl. No. 12/337,235, filed Dec. 17, 2008; 26 pages.
Advisory Action dated Mar. 22, 2012; U.S. Appl. No. 12/337,235, filed Dec. 17, 2008; 10 pages.
Notice of Allowance dated Sep. 11, 2012; U.S. Appl. No. 12/337,235, filed Dec. 17, 2008; 16 pages.
Office Action dated May 26, 2010, 9 pages, U.S. Appl. No. 12/337,214, filed Dec. 17, 2008.
Notice of Allowance dated Nov. 8, 2010, 10 pages, U.S. Appl. No. 12/337,214, filed Dec. 17, 2008.
Notice of Allowance dated Mar. 25, 2011, 11 pages, U.S. Appl. No. 12/337,214, filed Dec. 17, 2008.
Notice of Allowance dated May 27, 2011; U.S. Appl. No. 12/337,214, filed Dec. 17, 2008; 10 pages.
Office Action dated Aug. 9, 2012; U.S. Appl. No. 12/916,214, filed Oct. 29, 2010; 51 pages.
Final Office Action dated Nov. 27, 2012; U.S. Appl. No. 12/916,214, filed Oct. 29, 2010; 16 pages.
Office Action dated Jul. 18, 2011; U.S. Appl. No. 12/340,432, filed Dec. 19, 2008; 6 pages.
Office Action dated Sep. 16, 2011; U.S. Appl. No. 12/340,432, filed Dec. 19, 2008; 33 pages.
Final Office Action dated Mar. 23, 2012; U.S. Appl. No. 12/340,432, filed Dec. 19, 2008; 28 pages.
Notice of Allowance dated Jun. 20, 2012; U.S. Appl. No. 12/340,432, filed Dec. 19, 2008; 23 pages.
Office Action dated Nov. 10, 2011; U.S. Appl. No. 13/216,819, filed Aug. 24, 2011; 19 pages.
Final Office Action dated Apr. 19, 2012; U.S. Appl. No. 13/216,819, filed Aug. 24, 2011; 39 pages.
Office Action dated Apr. 18, 2013; U.S. Appl. No. 13/216,819, filed Aug. 24, 2011; 37 pages.
Final Office Action dated Sep. 17, 2013; U.S. Appl. No. 13/216,819, filed Aug. 24, 2011; 22 pages.
Notice of Allowance dated Nov. 25, 2013; U.S. Appl. No. 13/216,819, filed Aug. 24, 2011; 16 pages.
Office Action dated Aug. 17, 2010, 25 pages, U.S. Appl. No. 12/337,222, filed Dec. 17, 2008.
Final Office Action dated Jan. 14, 2011, 16 pages, U.S. Appl. No. 12/337,222, filed Dec. 17, 2008.
Office Action dated Feb. 1, 2012; U.S. Appl. No. 12/337,222, filed Dec. 17, 2008; 20 pages.
Final Office Action dated Jun. 7, 2012; U.S. Appl. No. 12/337,222, filed Dec. 17, 2008; 16 pages.
Office Action dated Dec. 3, 2012; U.S. Appl. No. 12/337,222, filed Dec. 17, 2008; 24 pages.
Office Action dated May 29, 2013; U.S. Appl. No. 12/337,222, filed Dec. 17, 2008; 26 pages.
Womack, James Earl, et al.; U.S. Appl. No. 12/331,992, filed Dec. 10, 2008; Title: Method and Apparatus for Discovery of Relay Nodes.
Womack, James Earl, et al.; U.S. Appl. No. 12/340,418, filed Dec. 19, 2008; Title: System and Method for Relay Node Selection.
Yu, Yi, et al.; U.S. Appl. No. 12/337,229, filed Dec. 17, 2008; Title: System and Method for Hybrid Automatic Repeat Request (HARQ) Functionality in a Relay Node.
Cai, Zhijun, et al.; U.S. Appl. No. 12/340,412, filed Dec. 19, 2008; Title: System and Method for Resource Allocation.
Yu, Yi, et al.; U.S. Appl. No. 12/337,207, filed Dec. 17, 2008; Title: System and Method for Multi-User Multiplexing.
Yu, Yi, et al.; U.S. Appl. No. 13/548,817, filed Jul. 13, 2012; Title: System and Method for Multi-User Multiplexing.
Womack, James Earl, et al.; U.S. Appl. No. 12/337,235, filed Dec. 17, 2008; Title: System and Method for Initial Access to Relays.
Cai, Zhijun, et al.; U.S. Appl. No. 12/337,214, filed Dec. 17, 2008; Title: System and Method for Autonomous Combining.
Cai, Zhijun, et al.; U.S. Appl. No. 12/916,214, filed Oct. 29, 2010; Title: System and Method for Autonomous Combining.
Yu, Yi, et al.; U.S. Appl. No. 12/340,432, filed Dec. 19, 2008; Title: Multiple-Input Multiple-Output (MIMO) with Relay Nodes.
Yu, Yi, et al.; U.S. Appl. No. 13/216,819, filed Aug. 24, 2011; Title: Multiple-Input Multiple-Output (MIMO) with Relay Nodes.
Cai, Zhijun, et al.; U.S. Appl. No. 12/337,222, filed Dec. 17, 2008; Title: System and Method for a Relay Protocol Stack.

(56) References Cited

OTHER PUBLICATIONS

Cai, Zhijun, et al.; U.S. Appl. No. 13/221,583, filed Aug. 30, 2011; Title: System and Method for Autonomous Combining.
Cai, Zhijun, et al.; U.S. Appl. No. 13/221,584, filed Aug. 30, 2011; Title: System and Method for Autonomous Combining.
Cai, Zhijun, et al.; U.S. Appl. No. 13/716,839, filed Dec. 17, 2012; Title: System and Method for Resource Allocation.
Yu, Yi, et al.; U.S. Appl. No. 13/842,584, filed Mar. 15, 2013; Title: System and Method for Hybrid Automatic Repeat Request (HARQ) Functionality in a Relay Node.
Womack, James Earl, et al.; U.S. Appl. No. 13/864,810, filed Apr. 18, 2013; Title: System and Method for Relay Node Selection.
3GPP TR 36.814v0.4.1; 3rd Generation Partnership Project; Technical Specification Group Radio Access Network; Further Advancements for E-UTRA Physical Layer Aspects; Release 9; Feb. 2009; 31 pages.
3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pages.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pages.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; Sep. 2008; 28 pages.
3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pages.
3GPP TS 36.321 V8.1.0; 3rd Generation Partnership Project; Technical Specification Group Radio Access Network; Evolved Universal Terrestrial Radio Access (E-UTRA); Medium Access Control (MAC) Protocol Specification; Release 8; Mar. 2008; 30 pages.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pages.
China Mobile, Vodafone, Huawei; TSG-RAN WG1 #54; Title: Application Scenarios for LTE-Advanced Relay; R1-082975; Jeju, Korea; Aug. 18-22, 2008; 7 pages.
Doppler, Klaus, et al.; "Assessment of Relay Based Deployment Concepts and Detailed Description of Multi-hop Capable RAN Protocols as Input for the Concept Group Work"; IST-4-027756 Winner II; D3.5.2 v1.0; Jun. 30, 2007; 24 pages.
Ericsson; TSG-RAN WG1 #53; Title: A Discussion on Some Technology Components for LTE-Advanced; R1-082024; Kansas City, Missouri; May 5-9, 2008; 11 pages.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 314 pages.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pages.
Motorola; Title: Classification of Relays; TSG-RAN WG1 #54; R1-083223; Jeju, South Korea; Aug. 18-22, 2008; 3 pages.
Pabst, Ralf et al.; Title: Relay-Based Deployment Concepts for Wireless and Mobile Broadband Radio; IEEE Communications Magazine; Sep. 2004; pp. 80-89.
3GPP TSG RAN WG1 Meeting #54; "Discussion on the Various Types of Relays"; R1-082397; Warsaw, Poland; Jun. 30-Jul. 4, 2008; 6 pages.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pages.
Qualcomm Europe; 3GPP TSG-RAN WG1 #54; Title: Operation of Relays in LTE-A; R1-083191; Jeju, S. Korea; Aug. 18-22, 2008; 5 pages.
3GPP TSG RAN WG1 Meeting #55; "L2 Relay Interference Mitigation"; R1-084102; Prague, Czech Republic; Nov. 10-14, 2008; 6 pages.
3GPP TSG RAN WG1 Meeting #55-bis; "Relay Control Signalling Resource Coordination"; R1-090027; Ljubljana, Slovenia; Jan. 12-16, 2009; 3 pages.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pages.
Soldani, David, et al.; Title: Wireless Relays for Broadband Access; IEEE Communications Magazine; Mar. 2008. pp. 58-66.
3GPP TSG RAN WG1 #54bis; "Decode and Forward Relays for E-UTRA Enhancements"; R1-083533; Prague, Czech Republic; Sep. 29-Oct. 3, 2008; 5 pages.
Parkvall, Stefan, et al.; "The Evolution of WCDMA Towards Higher Speed Downlink Packet Data Access"; IEEE VTC; May 6, 2001; 5 pages.
Rohde & Schwarz; "UMTS Long Term Evolution (LTE) Technology Introduction;" Application Note 1MA111; Sep. 2008; 55 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity—Part I: System Description"; IEEE Transactions on Communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Tao, Jeffrey Z., et al.; "Aggregation in 802.16j—Enhanced Concatenation and MPDU Construction"; IEEE C802.16j-06/178r2; Nov. 7, 2006; 18 pages.
Masato, Okuda, et al.; "MAC-PDU Reconstruction at RS"; IEEE C802.16j-07/022; Jan. 8, 2007; 3 pages.
Final Office Action dated Nov. 20, 2013; U.S. Appl. No. 12/337,222, filed Dec. 17, 2008; 28 pages.
Office Action dated Jan. 31, 2013; U.S. Appl. No. 13/221,583, filed Aug. 30, 2011; 69 pages.
Office Action dated May 10, 2013; U.S. Appl. No. 13/221,583, filed Aug. 30, 2011; 21 pages.
Final Office Action dated Sep. 6, 2013; U.S. Appl. No. 13/221,583, filed Aug. 30, 2011; 23 pages.
Advisory Action dated Dec. 6, 2013; U.S. Appl. No. 13/221,583, filed Aug. 30, 2011; 3 pages.
Office Action dated Mar. 4, 2014; U.S. Appl. No. 13/221,583, filed Aug. 30, 2011; 33 pages.
Office Action dated Feb. 5, 2013; U.S. Appl. No. 13/221,584, filed Aug. 30, 2011; 65 pages.
Final Office Action dated May 14, 2013; U.S. Appl. No. 13/221,584, filed Aug. 30, 2011; 15 pages.
Office Action dated May 23, 2014; U.S. Appl. No. 13/716,839, filed Dec. 17, 2012; 76 pages.
Office Action dated Sep. 11, 2013; U.S. Appl. No. 13/842,584, filed Mar. 15, 2013; 55 pages.
Final Office Action dated Feb. 28, 2014; U.S. Appl. No. 13/842,584, filed Mar. 15, 2013; 9 pages.
Advisory Action dated Apr. 17, 2014; U.S. Appl. No. 13/842,584, filed Mar. 15, 2013; 2 pages.
Office Action dated Dec. 20, 2013; U.S. Appl. No. 13/865,810, filed Apr. 18, 2013. 72 pages.
Office Action dated May 16, 2014; U.S. Appl. No. 13/865,810, filed Apr. 18, 2013. 31 pages.
PCT International Search Report; PCT Application No. PCT/US2009/030967; Sep. 8, 2009; 5 pages.
PCT Written Opinion of the International Searching Authority; PCT Application No. PCT/US2009/030967; Sep. 8, 2009; 9 pages.

(56) References Cited

OTHER PUBLICATIONS

Australian Examination Report; Application No. 2009325082; Jul. 11, 2011; 2 pages.
Australian Examination Report; Application No. 2009325082; Mar. 28, 2012; 3 pages.
Canadian Office Action; Application No. 2,746,635; Apr. 18, 2013; 3 pages.
Canadian Office Action; Application No. 2,746,635; Jan. 14, 2014; 3 pages.
Chinese Office Action; Application No. 200980149651.4; Aug. 23, 2013; 14 pages.
Chinese Office Action as Received in Co-pending Application No. 200980149651.4 on May 6, 2014; 3 pages. (No English translation available).
Japanese Office Action; Application No. 2011-540716; Oct. 4, 2012; 5 pages.
Japanese Office Action as Received in Co-pending Application No. 2011-540716 on Dec. 13, 2013; 3 pages. (No English translation available).
Korean Office Action; Application No. 10-2011-7015882; Sep. 18, 2012; 10 pages.
Korean Office Action; Application No. 10-2011-7015882; Mar. 21, 2013; 7 pages.
PCT International Search Report; PCT Application No. PCT/US2009/062551; Jan. 28, 2010; 4 pages.
PCT Written Opinion of the International Searching Authority; PCT Application No. PCT/US2009/062551; Jan. 28, 2010; 5 pages.
Canadian Office Action; Application No. 2,747,593; May 24, 2013; 3 pages.
Canadian Office Action; Application No. 2,747,593; May 28, 2014; 4 pages.
PCT International Search Report; PCT Application No. PCT/US2009/062554; May 12, 2010; 6 pages.
PCT Written Opinion of the International Searching Authority; PCT Application No. PCT/US2009/062554; May 12, 2010; 7 pages.
Australian Office Action; Application No. 2009333788; Dec. 8, 2011; 3 pages.
Canadian Office Action; Application No. 2,747,339; May 1, 2013; 2 pages.
Canadian Office Action; Application No. 2,747,339; May 6, 2014; 2 pages.
Chinese Office Action; Application No. 200980156929.0; Aug. 1, 2013; 14 pages.
Chinese Office Action; Application No. 200980156929.0; Feb. 12, 2014; 13 pages.
European Examination Report; Application No. 09748915.7; May 14, 2012; 3 pages.
Japanese Office Action; Application No. 2011-542161; Nov. 1, 2012; 17 pages.
Japanese Office Action; Application No. 2011-542161; Aug. 29, 2013; 7 pages.
Korean Office Action; Application No. 10-2011-7016626; Jul. 17, 2012; 7 pages.
Korean Office Action; Application No. 10-2011-7016626; Oct. 26, 2012; 8 pages.
Korean Office Action; Application No. 10-2011-7016626; May 20, 2013; 5 pages.
PCT International Search Report; PCT Application No. PCT/US2009/062557; Feb. 10, 2010; 4 pages.
PCT Written Opinion of the International Searching Authority; PCT Application No. PCT/US2009/062557; Feb. 10, 2010; 7 pages.
Canadian Office Action; Application No. 2,747,625; May 3, 2013; 3 pages.
European Examination Report; Application No. 09761065.3; May 7, 2012; 4 pages.
European Examination Report; Application No. 09761065.3; May 16, 2013; 3 pages.
Chinese Office Action; Application No. 200980157135.6; Jul. 25, 2013; 13 pages.
Yu, Yi, et al.; U.S. Appl. No. 14/465,528, filed Aug. 21, 2014; Title: System and Method for Hybrid Automatic Repeat Request (HARQ) Functionality in a Relay Node; 33 pages.
Notice of Allowance dated Jun. 24, 2014; U.S. Appl. No. 12/331,992, filed Dec. 10, 2008; 10 pages.
Final Office Action dated Jul. 10, 2014; U.S. Appl. No. 13/221,583, filed Aug. 30, 2011; 19 pages.
Notice of Allowance dated Jun. 23, 2014; U.S. Appl. No. 13/716,839, filed Dec. 17, 2012; 10 pages.
Notice of Allowance dated Aug. 11, 2014; U.S. Appl. No. 13/842,584, filed Mar. 15, 2013; 30 pages.
Canadian Office Action; Application No. 2,747,349; Jun. 4, 2014; 3 pages.
Notice of Allowance dated Jul. 24, 2015; U.S. Appl. No. 13/865,810, filed Apr. 18, 2013; 14 pages.
Chinese Office Action; Application No. 200980149651.4; Jun. 5, 2015; 13 pages.
Advisory Action dated Sep. 16, 2014; U.S. Appl. No. 13/221,583, filed Aug. 30, 2011; 18 pages.
Final Office Action dated Sep. 17, 2014; U.S. Appl. No. 13/865,810, filed Apr. 18, 2013; 42 pages.
Office Action dated Oct. 16, 2014; U.S. Appl. No. 13/865,810, filed Apr. 18, 2013; 38 pages.
Japanese Office Action as Received in Co-pending Application No. 2011-540716 on Aug. 22, 2014; 2 pages. (No English translation available).
Chinese Office Action; Application No. 200980156929.0; Sep. 2, 2014; 7 pages.
Womack, James Earl, et al.; U.S. Appl. No. 14/878,613, filed Oct. 8, 2015; Title: System and Method for Relay Node Selection; 27 pages.
Office Action dated Sep. 10, 2015; U.S. Appl. No. 14/465,528, filed Aug. 21, 2014; 8 pages.
European Examination Report; Application No. 09752588.5; Aug. 28, 2015; 7 pages.
Office Action dated Mar. 2, 2016; U.S. Appl. No. 12/916,214, filed Oct. 29, 2010; 55 pages.
Notice of Allowance dated Feb. 24, 2016; U.S. Appl. No. 14/465,528, filed Aug. 21, 2014; 89 pages.
European Examination Report; Application No. 09739422.4; May 2, 2016; 7 pages.
Chinese Office Action as Received in Co-pending Application No. 200980156892.1 on Feb. 15, 2015; 6 pages. (No English translation available).
Notice of Allowance dated Jul. 1, 2016; U.S. Appl. No. 12/916,214, filed Oct. 29, 2010; 12 pages.
European Examination Report; Application No. 09756368.8; Nov. 14, 2016; 5 pages.

* cited by examiner

SYSTEM AND METHOD FOR MULTI-USER MULTIPLEXING

CROSS-REFERENCE TO RELATED APPLICATION

This application is a continuation of U.S. patent application Ser. No. 13/548,817 filed Jul. 13, 2012 by Yi Yu, et al., entitled, "System and Method for Multi-User Multiplexing", which is a continuation of U.S. patent application Ser. No. 12/337,207 filed Dec. 17, 2008 by Yi Yu, at al., entitled, "System and Method for Multi-User Multiplexing", both of which are incorporated by reference herein as if reproduced in their entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node. A user agent can be said to be "camped" on a relay node if the user agent is in communication primarily with the relay node. Similarly, a UA can be said to be "camped" on an access node if the UA is in communication primarily with the access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Previously only one MAC PDU was transmitted per transport block per user agent. See, for example, the 3GPP technical specification 36.321 v8.3.0 (2008-03), page 23, paragraph 5. This solution is not efficient when there is a network node, such as a relay node, which could combine the transport blocks from multiple users. The illustrative embodiments described herein provide for a mechanism, for among others, multiplexing the transmissions of multiple users between a relay node and a network node, such as an access node or a layer three relay node.

In particular, the illustrative embodiments provide for a relay node to communicate with an access node and with a plurality of user agents. Each user agent utilizes a resource from the relay node to transmit medium access control layer (MAC) packet data units (PDUs). The information contained in a MAC PDU may be related to one or more voice or data sessions, or other control information used by each UA. The relay node can be configured to multiplex a plurality of MAC PDUs that correspond to the plurality of user agents. As a result of multiplexing, a Super-MAC PDU is created at the relay node. The Super-MAC PDU is then transmitted from the relay node to the access node, which in turn demultiplexes the Super-MAC PDU.

On the return side, the access node can create a Super-MAC PDU comprising MAC PDUs destined for a plurality of user agents serviced by a particular relay node. The access node may then transmit the Super-MAC PDU to the relay node. The relay node then demultiplexes the Super-MAC PDU and transmits component MAC PDUs to corresponding user agent for each MAC PDU.

Thus, the embodiments provide for a relay node. The relay node includes a processor configured to multiplex a plurality of medium access control layer (MAC) packet data units (PDUs) that correspond to a plurality of user agents to form a Super-MAC PDU. The following figures and corresponding description further describe and illustrate these concepts.

Figure 1:
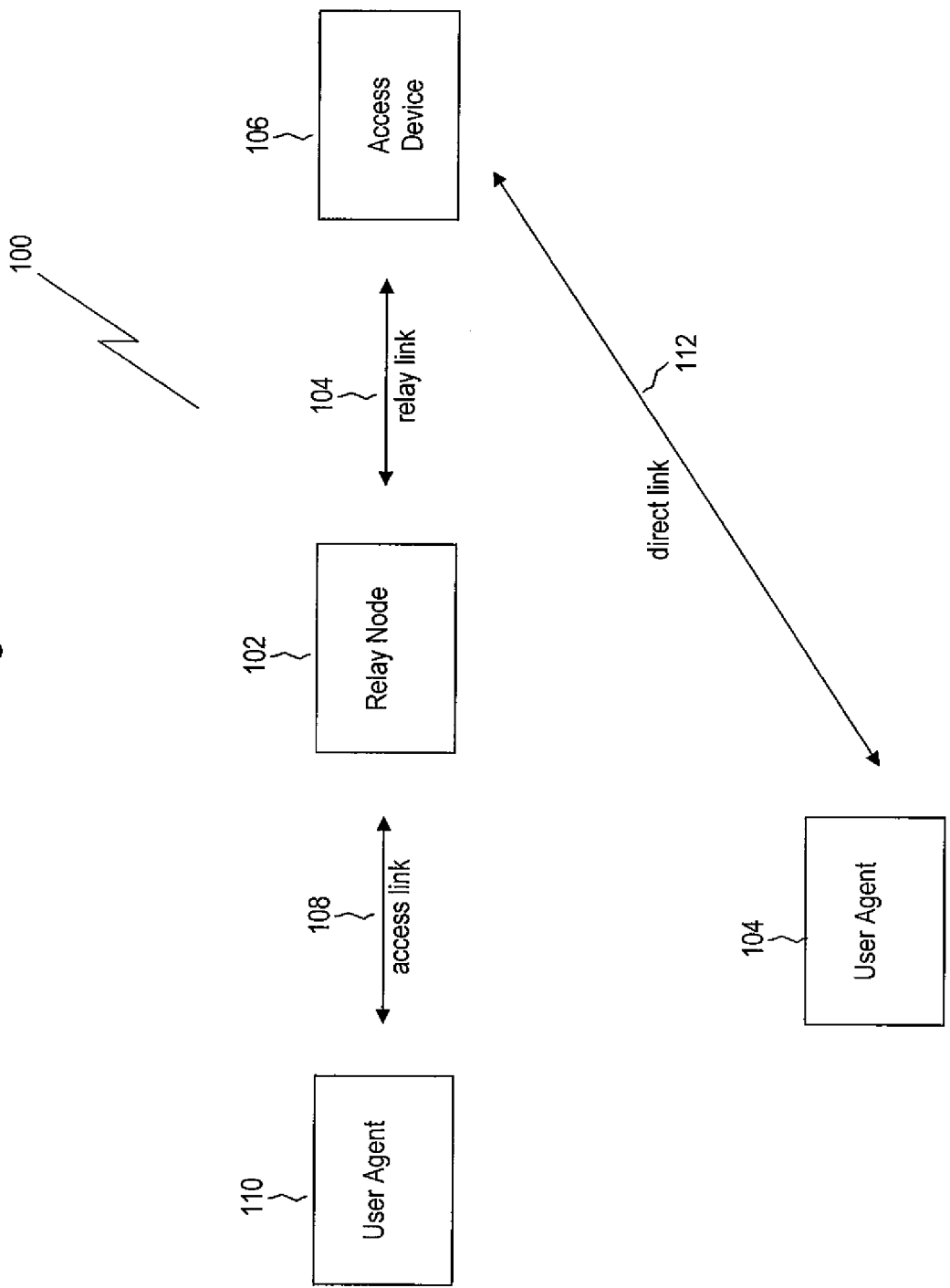
FIG. 1 is a diagram illustrating a wireless communication system using a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

Figure 2:
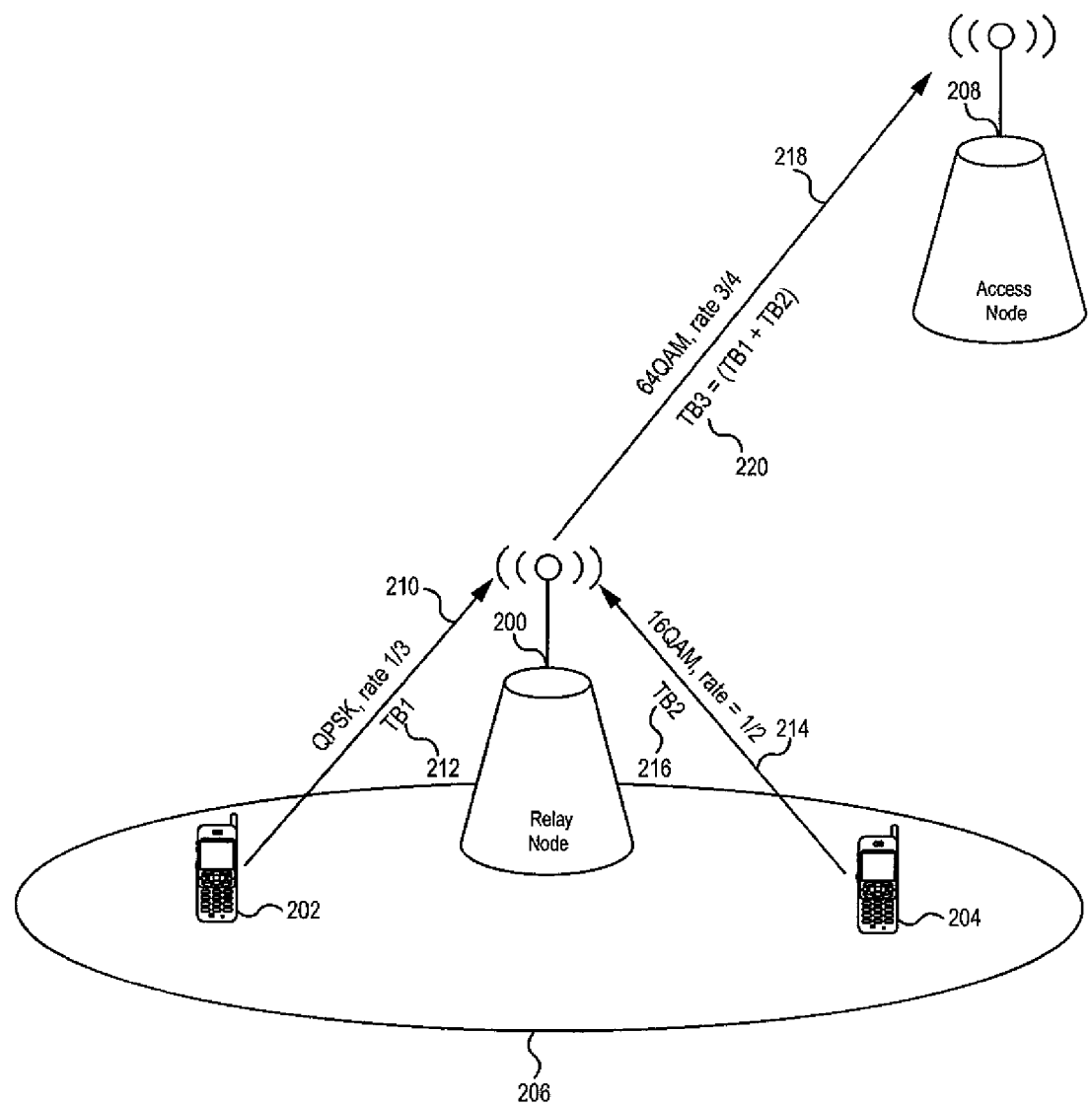
FIG. 2 is a diagram illustrating multi-user multiplexing over a relay node, according to an embodiment of the disclosure.

FIG. 2 is a diagram illustrating multi-user multiplexing over a relay node 200, according to an embodiment of the disclosure. The relay node 200 receives wireless communications from one or more user agents, such as user agent 202 and user agent 204, within relay coverage 206. Relay coverage 206 represents an approximate geographical area of coverage in which relay node 200 can receive wireless communications from user agent 202 and user agent 204. In turn, relay node 200 retransmits wireless communications from user agent 202 and user agent 204 to access node 208. Access node 208 can receive these wireless communications and further process them. Ultimately, the communications from user agent 202 and user agent 204 will reach their intended destinations.

Communications from user agent 202 and user agent 204 to relay node 200 and thence to access node 208 are called uplink communications. However, communications can also be received in a similar manner during downlink communications from access node 208 to relay node 200 and thence to user agent 202 and user agent 204.

Different user agents can transmit information to relay node 200 using different wireless communication techniques, or modulation and coding schemes (MCS). For example, a user agent may communicate with a relay node by transmitting data packets called transport blocks (TBs). User agent 202 may use a modulation and coding scheme known as Quadrature Phase-Shift Keying (QPSK), with turbocoding rate 1/3, as shown by arrow 210, to transmit transport block one (TB1) 212. However, user agent 204 may use a modulation and coding scheme known as 16 Quadrature Amplitude Modulation (16-QAM), with turbo-encoding rate 1/2, as shown by arrow 214 to transmit transport block two (TB2) 216.

Relay node 200 may use a still different modulation and coding scheme for communication with the access node 208 if channel conditions between the relay node 200 and access node 208 are more suitable. In the exemplary case, relay node 200 operates under very good radio conditions for communication with the access node 208. Because of these facts, relay node 200 and access node 208 may communicate via a modulation and coding scheme known as 64 point Quadrature Amplitude Modulation 64-QAM at a very high coding rate, as shown by arrow 218. However, other modulation and coding schemes could be used. Regardless of the modulation and coding scheme (MCS) that is used, relay node 200 transmits to access node 208 a third transport block, TB3 220. TB3 220 includes the data for both TB1 212 and TB2 216. Dependent on the channel conditions, the size of the TB3 220 may vary and may include the MAC PDUs from different UAs.

Although the system described with respect to FIG. 2 functions for its intended purpose, in some embodiments, the system could be further improved to increase efficiency. Specifically, on the relay link represented by arrow 218, multiple user agent medium access control layer (MAC) packet data units (PDUs) can be multiplexed into a super media access control layer packet data unit (Super-MAC PDU).

Figure 3:
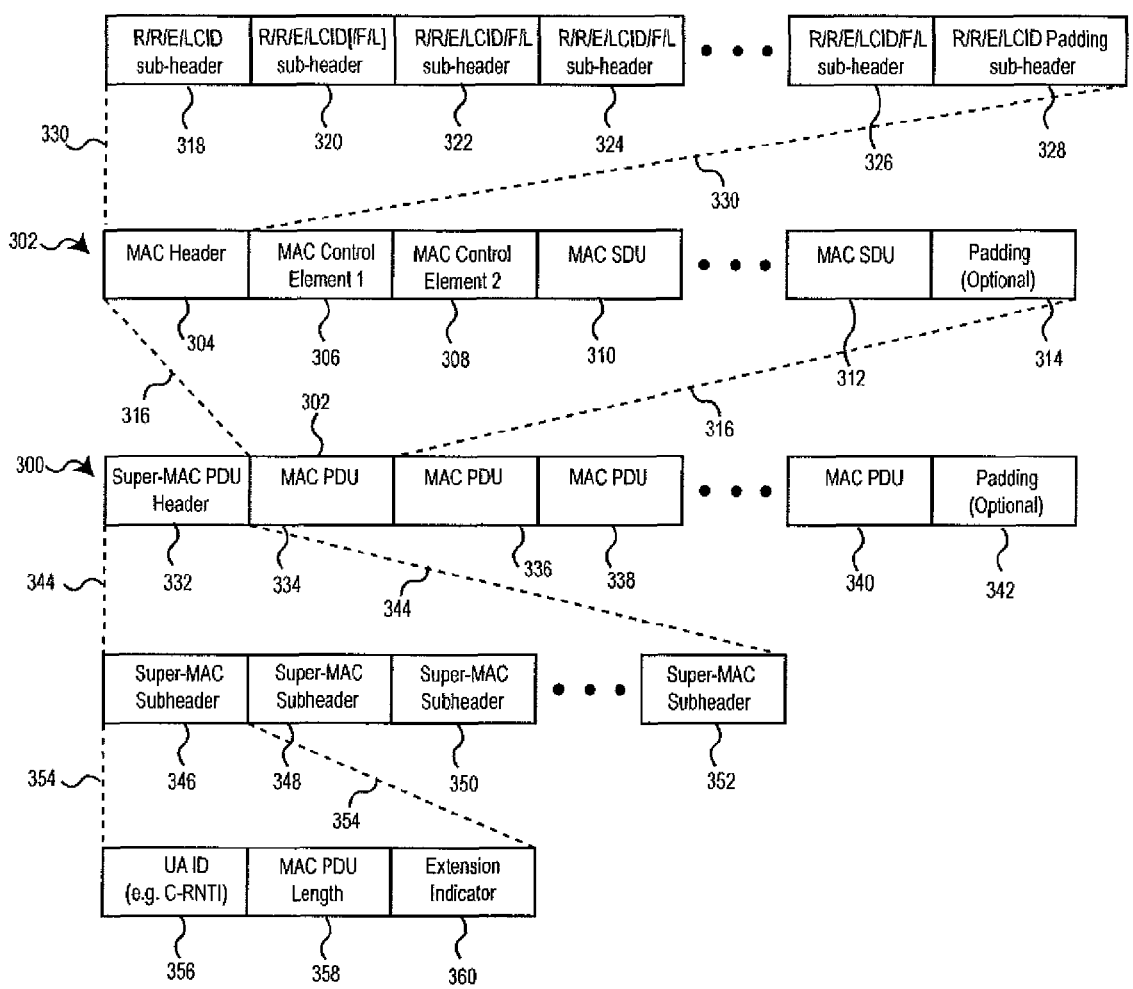
FIG. 3 is a block diagram of an exemplary super media access layer packet data unit (super MAC PDU) format, according to an embodiment of the disclosure.

FIG. 3 is a block diagram of an exemplary super medium access control layer packet data unit (Super-MAC PDU) format, according to an embodiment of the disclosure. Super-MAC PDU 300 is a combination of medium access control layer packet data units (MAC PDUs) that have been multiplexed into a single Super-MAC PDU. Super-MAC PDU 300 can be transmitted between a relay node and an access node, such as the communication shown by arrow 218 in FIG. 2. Super-MAC PDU 300 can be transmitted using the same modulation and coding scheme as shown in FIG. 2, or could use some other modulation and coding scheme. In an illustrative embodiment, Super-MAC PDU 300 is sent by the relay node 200 in lieu of TB3 220.

Super-MAC PDU 300 is composed of a plurality of individual media access layer packet data units (MAC PDUs). In FIG. 3, MAC PDU 302 is a non-limiting example of one MAC PDU. MAC PDU 302 is a data packet having the structure shown in FIG. 3. In turn, the media access layer (MAC) has several functions in wireless communications, including mapping between upper layers and a physical layer, Hybrid ARQ processing, transport format selection, priority handling and scheduling, and others. In an illustrative embodiment, one of the functions of the medium access control layer is the distribution and management of common uplink and downlink resources to multiple user agents, such as user agent 202 and user agent 204 in FIG. 2.

MAC PDU 302 includes a number of components. For example, MAC PDU 302 includes a medium access control layer header (MAC header 304) that contains a number of MAC sub-headers, as shown by phantom lines 330. The sub-headers include, but are not limited to, sub-header 318, sub-header 320, sub-header 322, sub-header 324, sub-header 326, and padding sub-header 328. These sub-headers contain information useful for MAC PDU 302, according to accepted technical standards defined in the 3GPP technical specifications. Additionally, MAC PDU 302 may include a number of MAC control elements, such as but not limited to MAC control element 306 and MAC control element 308. MAC PDU 302 can also include a number of MAC service data units (MAC SDUs), such as but not limited to MAC SDU 310 and MAC SDU 312. MAC PDU 302 optionally includes data padding 314. As shown by phantom lines 316, all of these elements are combined into one MAC PDU 302.

Previously, a maximum of one MAC PDU could be transmitted per transport block per user agent. See, for example, the 3GPP technical specification 36.321 v8.1.0 (2008-03), page 23, paragraph 5. As previously discussed, the illustrative embodiments described herein provide for a mechanism of overcoming this limitation by multiplexing the transmissions of multiple users between a relay node and an access node.

Super-MAC PDU 300 includes MAC PDU 302 and further may include one or more additional MAC PDUs, such as MAC PDU 336, MAC PDU 338, and MAC PDU 340. Each of these additional media access layer packet data units (MAC PDUs) have a structure similar to that shown with respect to MAC PDU 302. Each of MAC PDU 302, MAC PDU 336, MAC PDU 338, and MAC PDU 340 are multiplexed into Super-MAC PDU 300.

The size of the Super-MAC PDU 300 may be equal to or less than the transport block size (TBS) requested from the physical layer. For example, padding may be added to the Super-MAC PDU 300 to fill out the requested TBS from the physical layer. The number of MAC PDUs that are multiplexed into the Super-MAC PDU 300 may vary. One factor that may alter the number of MAC PDUs multiplexed into the Super-MAC PDU is the channel condition. For example, when the channel condition is good, more MAC PDUs from different UAs may be multiplexed into a single Super-MAC PDU. When the channel condition is bad, fewer MAC PDUs may be multiplexed into the Super-MAC PDU.

After the Super-MAC PDU is formed and delivered to the physical layer for transmission, Cyclic Redundancy Check (CRC) bits may be appended to the Super-MAC PDU for error detection and correction. The CRC bits may be used for error detection and correction of transmissions between the relay node and access node. For example, on the downlink relay link, if the relay node determines that a Super-MAC PDU is successfully received using a CRC check at the relay node, the relay node may transmit a hybrid automatic-repeat-request (HARQ) acknowledgement to the access node. If the CRC check indicates that Super-MAC PDU is not received successfully at the relay node, the relay node may transmit a HARQ non-acknowledgement to the access node and the access node may perform the HARQ retransmission of the Super-MAC PDU accordingly.

Super-MAC PDU 300 may also include other components. For example, Super-MAC PDU 300 can include Super-MAC PDU header 322. Super-MAC PDU 300 may also include optional padding data 342. For example, in order to make the total length of the Super-MAC PDU an integer number of bytes optional non-essential padding data 342 may be included.

As shown by phantom lines 344, Super-MAC PDU header 322 includes one or more Super-MAC subheaders, such as but not limited Super-MAC subheader 346, Super- MAC subheader 348, Multi-MAC subheader 350, and Super-MAC subheader 352. Each Super-MAC subheader corresponds to a particular MAC PDU within Super-MAC PDU 300. In the present example, each Super-MAC PDU subheader is byte-aligned.

In turn, as shown by phantom lines 354, each Super-MAC subheader includes a number of components. For example, Super-MAC subheader 346 includes at least a user agent identification 356 (UA ID 356), a MAC PDU length 358, and an extension indicator 360. The user agent identification 356 identifies the particular user agent associated with a given medium access control layer packet data unit (MAC PDU). The MAC PDU length 358 indicates a length of the MAC PDU contained in the super MAC PDU for the corresponding user agent. The extension indicator 360 indicates whether there exists more MAC PDU subheaders following the current MAC PDU subheader. Extension indicator 360 can be implemented as a single bit.

In use, on downlink communications over the relay link, the MAC for the relay node will disassemble the Super-MAC PDU and deliver or forward each MAC PDU contained therein accordingly. This process is described further with respect to FIG. 4.

Figure 4:
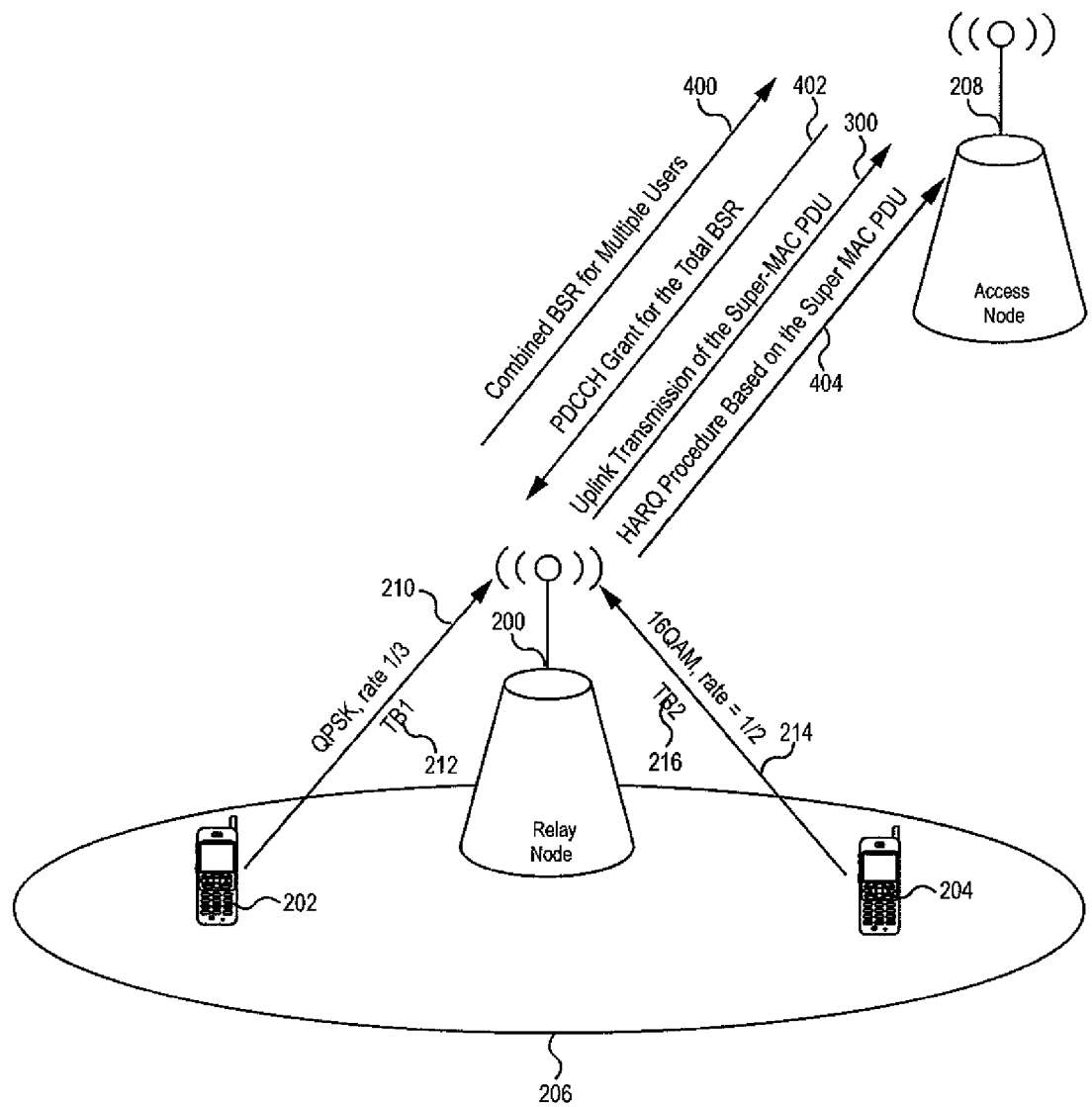
FIG. 4 is a diagram illustrating an exemplary uplink procedure with multi-user multiplexing, according to an embodiment of the disclosure.

FIG. 4 is a diagram illustrating an exemplary uplink procedure with multi-user multiplexing, according to an embodiment of the disclosure. FIG. 4 is similar to FIG. 2; thus, reference numerals in FIG. 4 refer to similar items and have similar properties as the items for the same reference numerals in FIG. 2. However, in FIG. 4, Super-MAC PDU 300 is transmitted between relay node 200 and access node 208. The processes shown in FIG. 4 can be implemented using corresponding processors on the relay node 200 and the access node 208, wherein the corresponding processors are configured to carry out the functions described herein.

On the uplink, the medium access control layer (MAC) for relay node 200 first calculates a total amount of data for the uplink transmission from all of the buffers of the user agents (this may include all the possible headers, for example, MAC layer headers, Radio Link Control layer headers, etc.). The MAC for the relay node 200 then forms a single, combined buffer status report (BSR 400). The relay node 200 then transmits the buffer status report to the access node 208. In turn, the access node 208 will grant the relay node 200 enough resources for the uplink communication. They access node 208 may use only the relay node identification (RN ID) on the physical downlink control channel (PDCCH 402) to indicate the grant of resources and may not include the specific user agent identifications.

After receiving the PDCCH grant, the medium access control layer of the relay node may form the Super-MAC PDU 300 and transmit the Super-MAC PDU 300 to the access node 208 in the allocated uplink resource. This transmission is illustrated using one hybrid automatic-repeat-request (HARQ 404), though multiple HARQs could be used. After receiving Super-MAC PDU 300, the access node 208 demultiplexes the Super-MAC PDU 300 and delivers each resulting component media access layer packet data unit (MAC PDU) accordingly.

The above description relates to uplink communications which, again, include communications from the relay node 200 to the access node 208. A similar procedure is performed in reverse during downlink communications which, again, are communications from the access node 208 to the relay node 200. For downlink communications, the access node 208 forms a Super-MAC PDU 300 for communications to all of the user agents utilizing a particular relay node 200. The access node 208 then delivers the Super-MAC PDU 300 to the relay node 200. The relay node 200 media access layer then disassembles (demultiplexes) the Super-MAC PDU 300. Then the relay node 200 may deliver each resulting component media access layer packet data unit (MAC PDU) to the corresponding radio link control (RLC) layer for each corresponding user agent. The relay node 200 then forwards data to each corresponding user agent, perhaps using a different modulating and coding scheme for each corresponding user agent, depending on the individual radio conditions of the corresponding user agents.

The illustrative embodiments represent several advances over the known art. For example, high coding gain is possible due to a larger transport block (TB) size. By concatenating multiple media access layer packet data units (MAC PDUs) together, the transport block size is increased. This increase in transport block size potentially increases the turbo-coding gain.

Additionally, by using a Super-MAC PDU, physical downlink control channel (PDCCH) overhead reduction can be achieved in some embodiments. For example, the access node 208 may only need to transmit a single PDCCH grant for the uplink or downlink, instead of multiple PDCCH grants per user agent on the relay link. Transmitting only a single PDCCH grant potentially increases the capacity of the physical downlink control channel (PDCCH).

Further, using a Super-MAC PDU allows for buffer status report and scheduling request (SR) signaling reduction. By multiplexing multiple user agents' MAC PDUs together, the buffer status report becomes a joint buffer status report for multiple user agents utilizing a relay node. Therefore, multiple buffer status reports need not be transmitted for each user agent on the relay link. This result is also true for SRs. Hence, only one SR channel is needed for the relay link, rather than one SR channel per user agent.

Still further, by multiplexing multiple user agents' MAC PDUs together, the relay node 200 only monitors one radio network temporary identifier (RNTI) for PDCCH grants. Specifically, the relay node 200 only monitors the RNTI of the relay node 200. This procedure simplifies reception of the PDCCH at the relay node 200.

While on the access link, every user agent has a corresponding individual HARQ process associated with the connection. By multiplexing multiple user agents' MAC PDUs together, it may be possible to utilize only one hybrid automatic-repeat-request (HARQ) process on the relay link for all user agents on the relay node. Thus, providing the Super-MAC PDU on the relay link improves utilization of the HARQ resources.

Figure 5A:
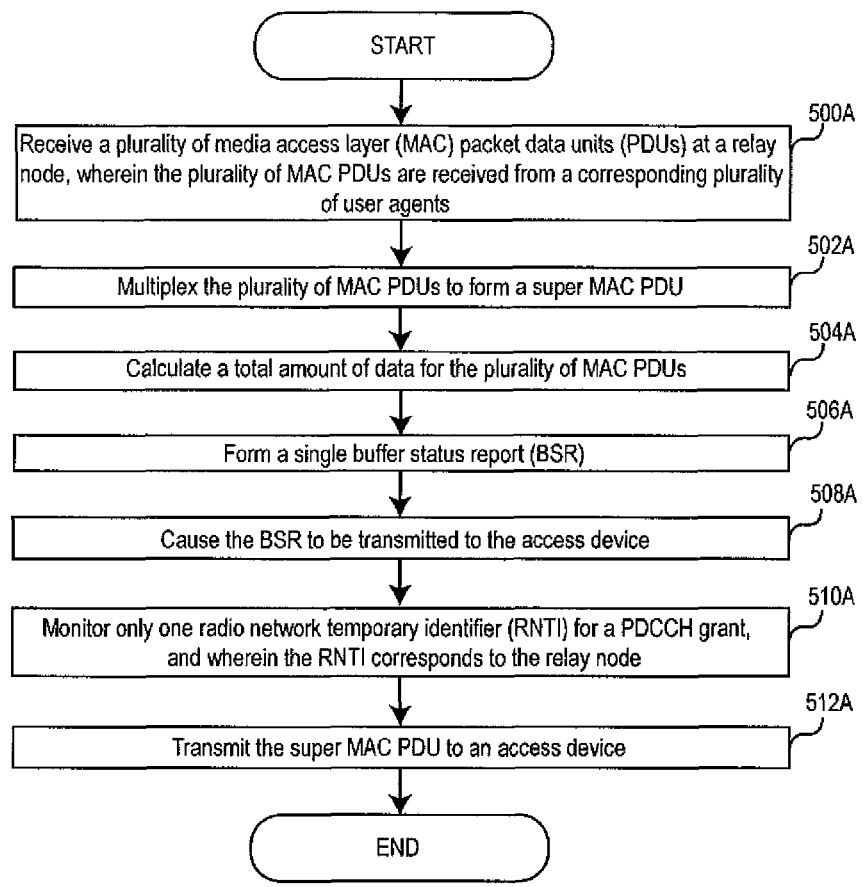
FIG. 5A is a flowchart illustrating multi-user multiplexing in a relay node, according to an embodiment of the disclosure.

FIG. 5A is a flowchart illustrating multi-user multiplexing in a relay node, according to an embodiment of the disclosure. The process shown in FIG. 5A can be implemented using the devices and methods described with respect to FIG. 2, FIG. 3, and FIG. 4. Elements of the process shown in FIG. 5A can be implemented by hardware, software, or combinations thereof in the relay node, such as relay node 200 of FIG. 2.

The process begins as the relay node receives a plurality of medium access control layer (MAC) packet data units (PDUs), wherein the plurality of MAC PDUs are received from a corresponding plurality of user agents (block 500A). In an embodiment, the relay node is a layer two relay node, but the relay node could be a different kind of relay node. Next, the relay node multiplexes the plurality of MAC PDUs to form a Super-MAC PDU (block 502A).

In an illustrative embodiment, the relay node calculates a total amount of data for the plurality of MAC PDUs (block 504A) within the Super-MAC PDU. In another illustrative embodiment, the relay node then forms a single buffer status report (BSR) (block 506A). In yet another illustrative embodiment, the relay node then causes the buffer status report to be transmitted to the access node (block 508A). In still another illustrative embodiment, the relay node monitors only one ran temporary identifier (RNTI) for a PDCCH grant, wherein the RNTI corresponds to the relay node (block 510A). Regardless of the procedures used in preparing the Super-MAC PDU for transmission, the relay node transmits the Super-MAC PDU to an access node (block 512A). The process terminates thereafter.

Although the process in FIG. 5A refers to a relay node receiving a plurality of MAC PDUs and multiplexing them into a Super-MAC PDU for transmission to an access node, the process can be reversed. Thus, the relay node could receive a Super-MAC PDU from an access node and then demultiplex the Super-MAC PDU to retrieve a plurality of MAC PDUs. The relay node would then transmit the each resulting individual MAC PDU to the corresponding user agent in communication with the relay node.

Figure 5B:
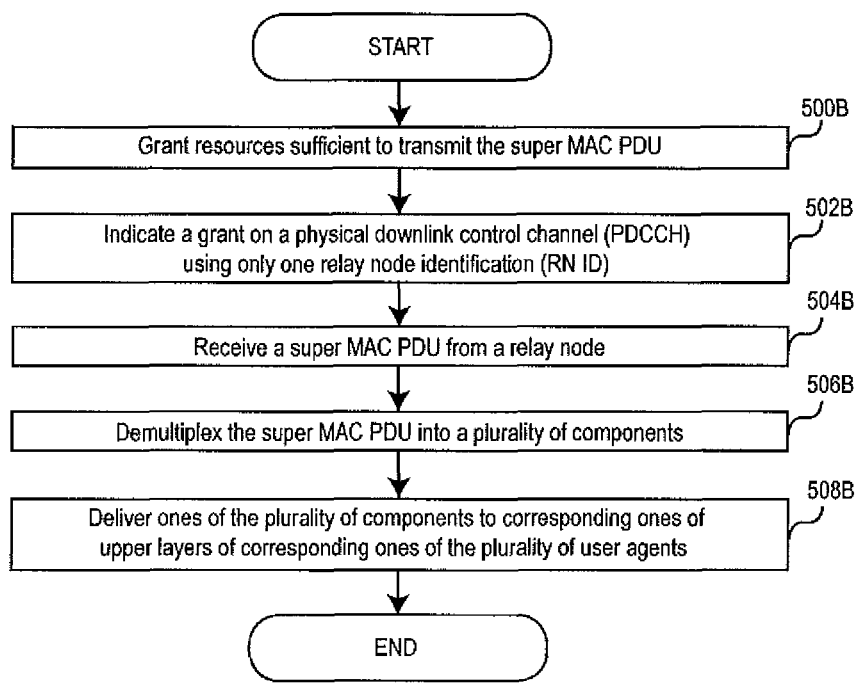
FIG. 5B is a flowchart illustrating multi-user multiplexing in an access device, according to an embodiment of the disclosure.

FIG. 5B is a flowchart illustrating multi-user multiplexing in an access node, according to an embodiment of the disclosure. The process shown in FIG. 5B can be implemented using the devices and methods described with respect to FIG. 2, FIG. 3, and FIG. 4. Elements of the process shown in FIG. 5B can be implemented using hardware, software, or combinations thereof in the relay node and/or access node, such as relay node 200 and access node 208 of FIG. 2. The process shown in FIG. 5B can occur in conjunction with the process shown in FIG. 5A.

In an illustrative embodiment, the access node grants resources sufficient to transmit the Super-MAC PDU (block 500B) to a relay node. In another illustrative embodiment, the access node indicates a grant on a physical downlink control channel (PDCCH) using only one relay node identification (RN ID) (block 502B) that corresponds to the relay node to which the Super-MAC PDU will be transmitted.

Regardless of the procedure used to prepare for receipt of a transmission from the relay node, the access node receives a Super-MAC PDU from the relay node (block 504B). The access node then demultiplexes the Super-MAC PDU into a plurality of component MAC PDUs (block 506B). The access node then processes and delivers ones of the plurality of component MAC PDUs to corresponding ones of upper layers of corresponding ones of the plurality of user agents (block 508B). The process terminates thereafter.

Although the process in FIG. 5B refers to an access node receiving a Super-MAC PDU and demultiplexing it into component MAC PDUs for transmission to upper layers of a plurality of user agents, the process can be reversed. Thus, the access node could multiplex a plurality of component MAC PDUs into a Super-MAC PDU. The access node would then transmit the resulting Super-MAC PDU to a relay node.

As described above, the relay node could then demultiplex the Super-MAC PDU and transmit the resulting component MAC PDUs to corresponding ones of the plurality of user agents. Thus, the processes represented by FIG. 5A and FIG. 5B contemplate multiplexing a plurality of component MAC PDUs into several Super-MAC PDUs, transmitting several Super-MAC PDUs, demultiplexing several Super-MAC PDUs, and, once a Super-MAC PDU is demultiplexed, transmitting component MAC PDUs accordingly, such as to corresponding upper layers of user agents.

The user agent 110 and other components described above might include a processing component that is capable of executing instructions related to the actions described above.

Figure 6:
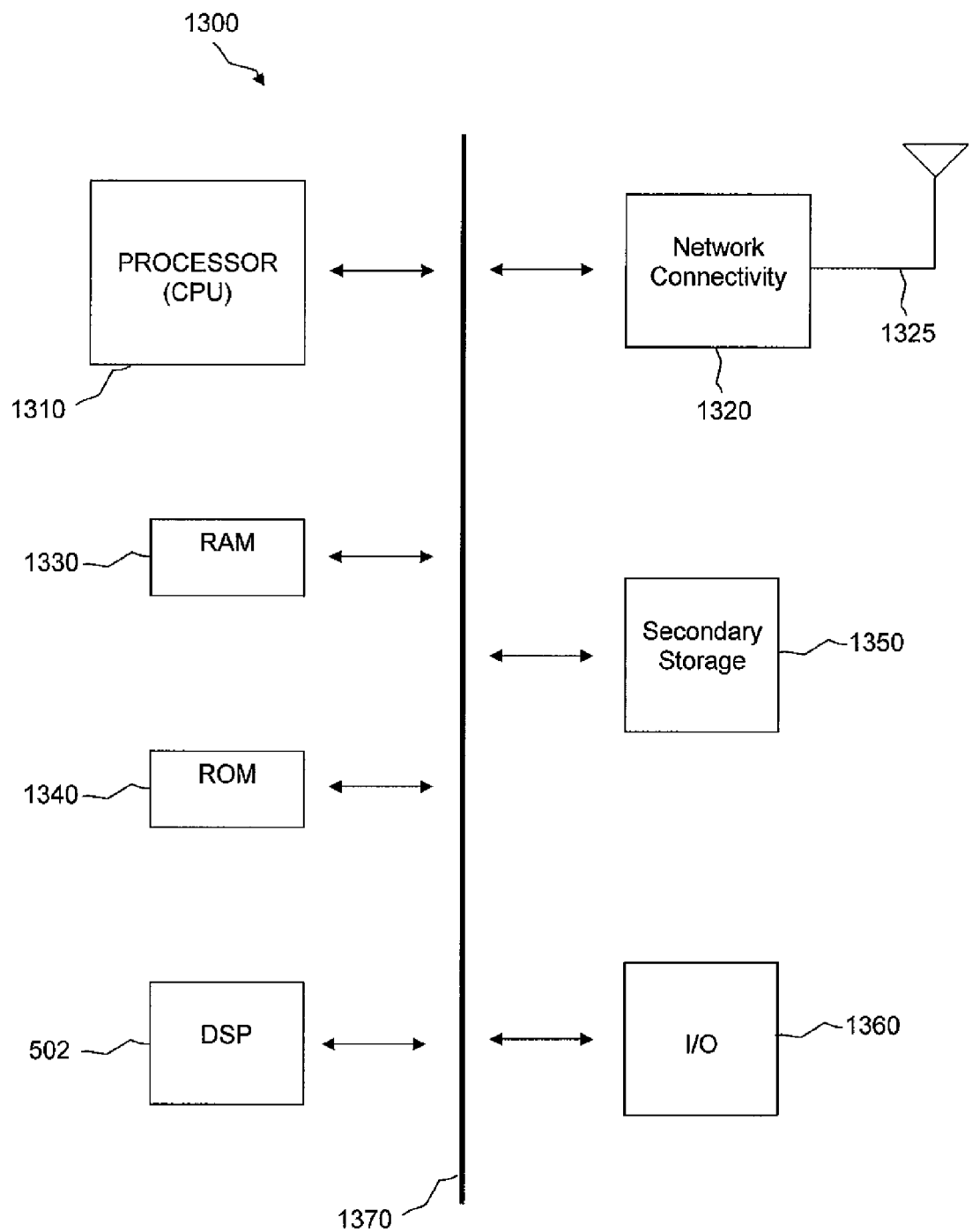
FIG. 6 illustrates a processor and related components suitable for implementing the several embodiments of the present disclosure.

FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 502. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.300, 3GPP TS 36.321.

As described herein, the illustrative embodiments provide for a device comprising a relay node in communication with an access node and with a plurality of user agents. The relay node comprises a layer two relay node or a layer three relay node. The relay node further comprises a first processor configured to multiplex a plurality of medium access control layer (MAC) packet data units (PDUs) that correspond to the plurality of user agents. The plurality of MAC PDUs, when multiplexed, are multiplexed into a Super-MAC PDU.

The illustrative embodiments also provide for a method implemented in a relay node. A plurality of medium access control layer (MAC) packet data units (PDUs) are received at the relay node. The plurality of MAC PDUs are received from a corresponding plurality of user agents. The relay node comprises a layer two relay node or a layer three relay node. The plurality of MAC PDUs are multiplexed to form a Super-MAC PDU.

The illustrative embodiments also provide for a device comprising an access node configured to communicate with a relay node. The access node is configured to multiplex a plurality of medium access control layer (MAC) packet data units (PDUs) into a Multi-MAC PDU. The MAC PDUs are related to a plurality of user agents camped on the relay node.

The illustrative embodiments also provide for a method implemented in an access node. The method comprises multiplexing a plurality of medium access control layer (MAC) packet data units (PDUs) into the Super-MAC PDU. The MAC PDUs are related to a plurality of user agents utilizing a relay node in communication with the access node.

Thus, the embodiments provide for a relay node including a processor configured to multiplex a plurality of medium access control layer (MAC) packet data units (PDUs) that correspond to a plurality of user agents to form a Super-MAC PDU.

The embodiments also provide for method implemented in a relay node. A plurality of medium access control layer (MAC) packet data units (PDUs) are received at the relay node. The plurality of MAC PDUs are multiplexed to form a Super-MAC PDU.

The embodiments further provide for an access node. The access node includes a processor configured to multiplex a plurality of medium access control layer (MAC) packet data units (PDUs) into a Super-MAC PDU. The plurality of MAC PDUs are related to a plurality of user agents camped on a relay node.

The embodiments still further provide for a method implemented in an access node. A plurality of medium access control layer (MAC) packet data units (PDUs) are multiplexed into a Super-MAC PDU. The plurality of MAC PDUs are related to a plurality of user agents.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A relay node for operating in a wireless communication network including an access node, wherein the relay node is configured to communicate wirelessly with the access node, the relay node comprising:
   a processor configured to:
      receive a first plurality of medium access control layer (MAC) packet data units (PDUs) from a plurality of user agents;
      multiplex the first plurality of MAC PDUs to form a first MAC PDU;
      transmit the first MAC PDU to the access node;
      receive a second MAC PDU from the access node;
      demultiplex the second MAC PDU into a second plurality of MAC PDUs;
      transmit one or more of the second plurality of MAC PDUs to corresponding one or more of the plurality of user agents;
      generate a single buffer status report (BSR) for multiple user agents based upon a total amount of data for uplink transmission; and
      transmit the single BSR to the access node,
      wherein the processor is further configured to monitor only one radio network temporary identifier (RNTI) for a scheduling grant, and wherein the RNTI corresponds to the relay node.

2. The relay node of claim 1 wherein the first and second MAC PDUs comprise a MAC PDU header, wherein the MAC PDU header includes a plurality of MAC PDU subheaders, and wherein ones of the MAC PDU subheaders correspond with ones of the plurality of MAC PDUs.

3. The relay node of claim 2 wherein a MAC PDU subheader comprises at least one of the following:
   user agent Identity information;
   a length of a corresponding MAC PDU; and
   an extension indicator.

4. The relay node of claim 1, wherein the number of MAC PDUs that are multiplexed into the MAC PDU can vary depending on channel conditions, and wherein the relay node calculates the total amount of data based on data stored in buffers belonging to the multiple user agents.

5. The relay node of claim 1 wherein only one hybrid automatic-repeat-request (HARQ) is used with respect to transmitting the first MAC PDU that is formed by multiplexing the plurality of MAC PDUs.

6. The relay node of claim 5 wherein the processor is further configured to append the first MAC PDU with cyclic redundancy check (CRC) bits at the physical layer for error detection and correction.

7. A method implemented in a relay node, the method comprising:
  receiving a first plurality of medium access control layer (MAC) packet data units (PDUs) from a plurality of user agents;
  multiplexing the first plurality of MAC PDUs to form a first MAC PDU;
  transmitting the first MAC PDU to an access node;
  receiving a second MAC PDU from the access node;
  demultiplexing the second MAC PDU into a second plurality of MAC PDUs;
  transmitting one or more of the second plurality of MAC PDUs to corresponding one or more of the plurality of user agents;
  generating a single buffer status report (BSR) for multiple user agents based upon a total amount of data for uplink transmission;
  transmitting the single BSR to the access node; and
  receiving an indication of a grant on a physical control channel using one relay node identification ID (RNID).

8. The method of claim 7 wherein the first MAC PDU comprises the plurality of MAC PDUs and a MAC PDU header that includes a plurality of MAC PDU subheaders, and wherein ones of the MAC PDU subheaders correspond with ones of the plurality of MAC PDUs.

9. The method of claim 8 wherein a MAC PDU subheader comprises at least one of the following:
  user agent identity information;
  a length of the corresponding MAC PDU; and
  an extension indicator.

10. The method of claim 7, wherein the number of MAC PDUs that are multiplexed into the MAC PDU can vary depending on channel conditions, and wherein the relay node calculates the total amount of data based on data stored in buffers of the multiple user agents.

11. The method of claim 7 further comprising:
  monitoring one radio network temporary identifier (RNTI) for a scheduling grant, wherein the RNTI corresponds to the relay node.

12. The method of claim 11 further comprising:
  using only one hybrid automatic-repeat-request (HARQ) with respect to transmitting the first MAC PDU.

13. The method of claim 12 further comprising:
  appending the first Super-MAC PDU with cyclic redundancy check (CRC) bits at the physical layer for error detection and correction.

14. An access node comprising:
  a processor configured to:
    multiplex a first plurality of medium access control layer (MAC) packet data units (PDUs) into a first MAC PDU, wherein the first plurality of MAC PDUs are related to a plurality of user agents camped on a relay node; and
    demultiplex a second MAC PDU received from the relay node, the second MAC PDU comprising a second plurality of MAC PDUs related to the plurality of user agents camped on the relay node; and
    transmit a single physical downlink control channel (PDCCH) grant to the relay node, and not transmit PDCCH grants for the plurality of user agents camped on the relay node.

15. The access node of claim 14 wherein the first MAC PDU comprises the plurality of MAC PDUs and a MAC PDU header that includes a plurality of MAC PDU subheaders, and wherein ones of the MAC PDU subheaders correspond with ones of the plurality of MAC PDUs, and wherein the access node is further configured to transmit the first MAC PDU to the relay node.

16. The access node of claim 15 wherein a MAC PDU subheader comprises at least one of the following:
  user agent identity information;
  a length of the corresponding MAC PDU; and
  an extension indicator.

17. The access node of claim 14 wherein the processor is further configured to receive a single buffer status report (BSR).

18. The access node of claim 17 wherein the processor is further configured such that one relay node identification (RN ID) is used on the PDCCH grant to the relay node from the access node.

19. The access node of claim 18 wherein the processor is further configured to provide one radio network temporary identifier (RNTI) for a scheduling grant, wherein the RNTI corresponds to the relay node.

20. The access node of claim 19 wherein only one hybrid automatic-repeat-request (HARQ) is used with respect to transmitting the first MAC PDU to the relay node.

21. The access node of claim 20 wherein the processor is further configured to append the first MAC PDU with cyclic redundancy check (CRC) bits at the physical layer for error detection and correction.

22. A method implemented in an access node, the method comprising:
  multiplexing a plurality of medium access control layer (MAC) packet data units (PDUs) into a first MAC PDU, wherein the plurality of MAC PDUs are related to a plurality of user agents;
  transmitting the first MAC PDU to a relay node;
  receiving a second MAC PDU from the relay node; and
  demultiplexing the second MAC PDU; and
  transmitting a single physical downlink control channel (PDCCH) grant to the relay node, and not transmitting PDCCH grants for the plurality of user agents camped on the relay node.

23. The method of claim 22, wherein multiplexing is performed such that the first MAC PDU comprises the plurality of MAC PDUs and a MAC PDU header that includes a plurality of MAC PDU subheaders, and wherein ones of the MAC PDU subheaders correspond with ones of the plurality of MAC PDUs.

24. The method of claim 23 wherein a MAC PDU subheader comprises at least one of the following:
  user agent identity information;
  a length of the corresponding MAC PDU; and
  an extension indicator.

25. The method of claim 22, wherein the number of MAC PDUs that are multiplexed into the MAC PDU can vary depending on channel conditions.

26. The method of claim 22 further comprising:
  receiving a single buffer status report (BSR).

27. The method of claim 26 further comprising:
  using one relay node identification (RN ID) on the PDCCH grant to the relay node from the access node.

28. The method of claim 27 further comprising:
  providing one radio network temporary identifier (RNTI) for a scheduling grant, wherein the RNTI corresponds to the relay node.

29. The method of claim 28 further comprising:
  appending the first MAC PDU with cyclic redundancy check (CRC) bits at the physical layer for error detection and correction.

* * * * *